(12) United States Patent
Howarter et al.

(10) Patent No.: US 8,654,248 B2
(45) Date of Patent: Feb. 18, 2014

(54) APPARATUS AND METHOD FOR HANDLING VIDEO ASPECT RATIOS OF VIDEO CONTENT

(75) Inventors: Jamie C. Howarter, Overland Park, KS (US); Douglas Ceballos, Olathe, KS (US); Michael Lesher, Louisburg, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 524 days.

(21) Appl. No.: 12/505,999

(22) Filed: Jul. 20, 2009

(65) Prior Publication Data

US 2011/0013079 A1    Jan. 20, 2011

(51) Int. Cl.
*H04N 7/01* (2006.01)
*H04N 11/20* (2006.01)
*G06K 9/32* (2006.01)
*G06F 3/00* (2006.01)
*G06F 13/00* (2006.01)
*H04N 5/445* (2011.01)
*H04N 7/16* (2011.01)

(52) U.S. Cl.
USPC ........... 348/445; 348/441; 348/448; 382/298; 725/46; 725/133

(58) Field of Classification Search
None
See application file for complete search history.

(56) References Cited

U.S. PATENT DOCUMENTS

| 5,999,220 | A  | * | 12/1999 | Washino | 348/441 |
| 8,068,699 | B2 | * | 11/2011 | Mitani | 382/298 |
| 2005/0024532 | A1 | * | 2/2005 | Choi | 348/441 |
| 2008/0030614 | A1 | * | 2/2008 | Schwab et al. | 348/441 |
| 2009/0190028 | A1 | * | 7/2009 | Rodriguez et al. | 348/448 |

* cited by examiner

*Primary Examiner* — Jefferey Harold
*Assistant Examiner* — Sean Haiem
(74) *Attorney, Agent, or Firm* — Swanson & Bratschun, L.L.C.

(57) ABSTRACT

A system and method for displaying video content in a proper aspect ratio may include, in response to video content being received from a personal computer, determining if the video content is configured to be displayed in the first aspect ratio. If the video content is configured to be displayed in the first aspect ratio, the video content is displayed in the first aspect ratio. Otherwise, if the video content is not configured to be displayed in the first aspect ratio, the video content is displayed in the second aspect ratio.

19 Claims, 3 Drawing Sheets

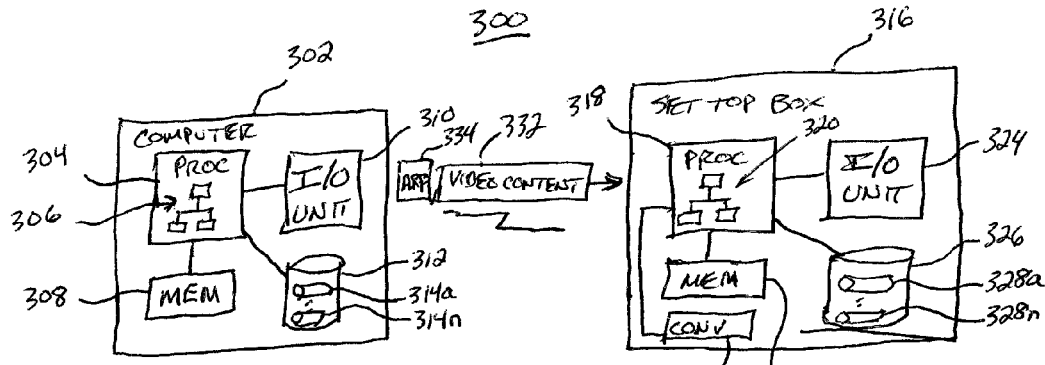
FIG. 3A
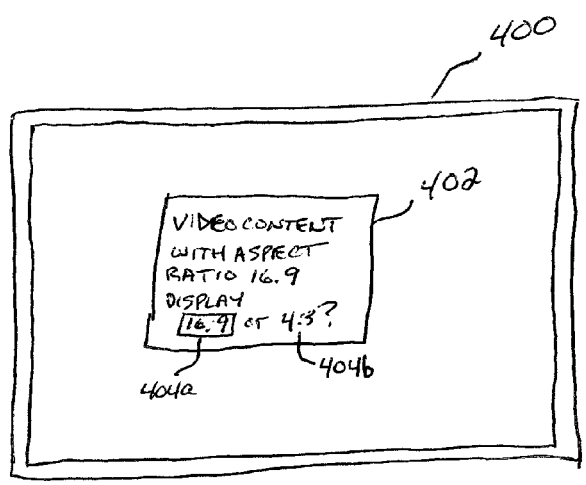
FIG. 4
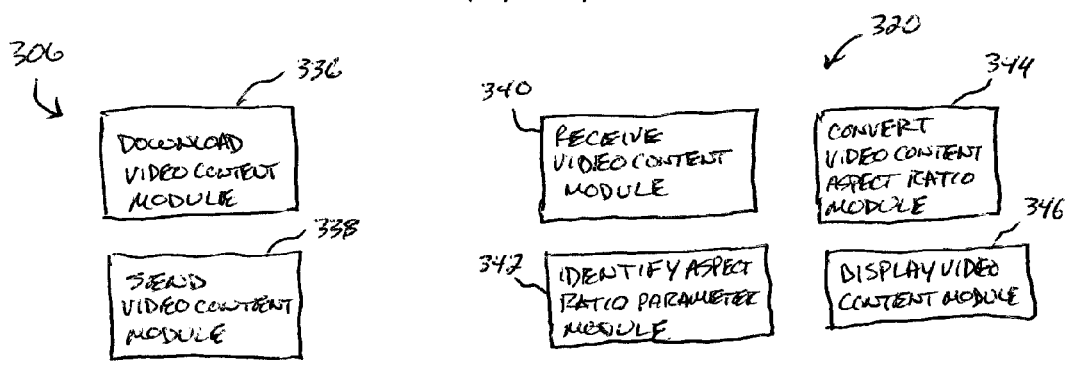
FIG. 3B
FIG. 3C

US 8,654,248 B2

APPARATUS AND METHOD FOR HANDLING VIDEO ASPECT RATIOS OF VIDEO CONTENT

BACKGROUND

Media content has become pervasive throughout society. What used to be limited to television, video content is now available to many different forms of media players, including personal computers, handheld media players, and mobile telephones, for example. Video format may be downloaded by personal computers in a number of different formats, including standard and high-definition. Personal computers are generally configured to display video content using a 4:3 aspect ratio, so video content downloaded to personal computers are played using a 4:3 aspect ratio, even if played onto a television that is configured to display video content using a 16:9 aspect ratio. As understood in the art, video content displayed using a 4:3 aspect ratio on a television capable of displaying video content using a 16:9 aspect ratio results in the video content being displayed in a center block of the television screen and blocks of non-content on each side of the video content.

SUMMARY

To overcome the problem of video content being delivered for play on a television capable of playing video content on a 16:9 aspect ratio, an apparatus and method for automatically or selectably converting video content from a 4:3 aspect ratio to a 16:9 aspect ratio may be utilized, thereby allowing for wide screen display of the video content.

One embodiment of a system and method for displaying video content in a proper aspect ratio may include, in response to video content being received from a personal computer, determining if the video content is configured to be displayed in the first aspect ratio. If the video content is configured to be displayed in the first aspect ratio, the video content is displayed in the first aspect ratio. Otherwise, if the video content is not configured to be displayed in the first aspect ratio, the video content is displayed in the second aspect ratio.

BRIEF DESCRIPTION

Illustrative embodiments of the present invention are described in detail below with reference to the attached drawing figures, which are incorporated by reference herein and wherein:

FIG. 3A is a block diagram of an illustrative computer and set top box in communication with one another;

FIGS. 3B and 3C are block diagrams of illustrative software modules executed on the computer and set top box, respectively, of FIG. 3A;

FIG. 4 is an illustration of an illustrative television prompting a user to select an aspect ratio for displaying video content.

DETAILED DESCRIPTION

Figure 1:
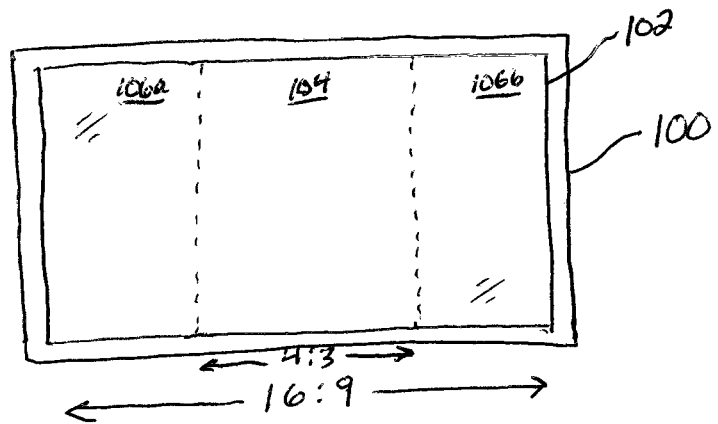
FIG. 1 is an illustration of an illustrative television that defines two aspect ratios on a television.

With regard to FIG. 1, an illustrative television 100 shows an electronic display 102. The electronic display 102 is shown to be subdivided into three areas, a first area or block 104 that defines an aspect ratio of 4:3 and two additional blocks, which, when added to the first block 104, defines an aspect ratio of 16:9. The television 100 is configured to display high definition video content formatted to be in an aspect ratio of 16:9 or standard definition video content in an aspect ratio of 4:3.

Figure 2:
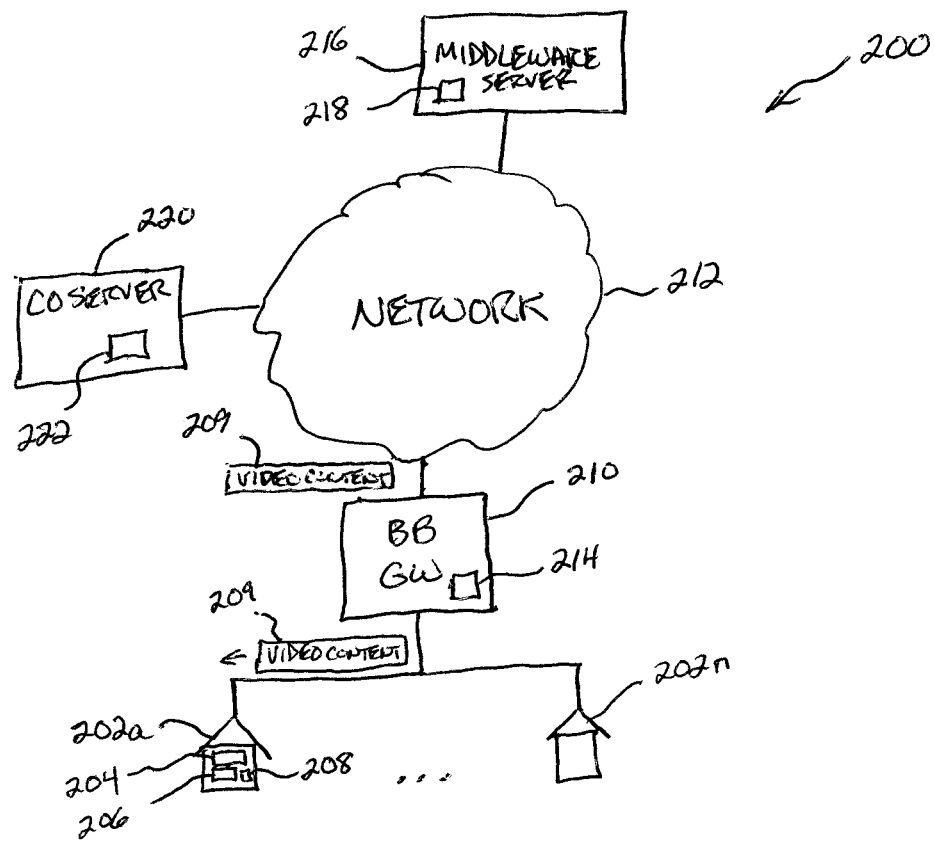
FIG. 2 is an illustrative network environment in which video content may be downloaded from a network onto a personal computer and displayed in an aspect ratio of 16:9 on a television via a set top box.

With regard to FIG. 2, an illustrative network environment 200 shows consumer residences 202a-202n (collectively 202) that are serviced by a communications service provider. As shown in residence 202a, a customer may have a television 204 configured to display high definition and standard definition video content. The customer may also have a set top box that communicates with a television 204. In addition, the customer may have a personal computer or other computing device that is capable of downloading video content from the Internet or other network. As may be performed by utilizing certain technology, the video content 209 may be communicated from the personal computer 208 to the set top box 206 for display on the television 204. The video content 209 may be high-definition video content capable of being displayed in a 16:9 aspect ratio.

A broadband gateway 210 that is in communication with network 212 may be configured to download the video content 209 from a head-end server (not shown) or other video server. The gateway 210 may execute software 214 that is capable of managing quality of service (QoS), thereby ensuring that the customers are able to download high-definition video content to computers or set top boxes. In one embodiment, the network 212 is the Internet. The network 212, however, may be any network capable of enabling a user to access video content not communicated from a conventional broadcaster. For example, the video content 209 may be downloaded from Internet websites, such as Hulu®, YouTube®, or other websites that distribute video content.

A middleware server 216 may be configured to operate in conjunction with the set top box 206 for managing content delivery to the set top box 206. The middleware server 216 may also operate in conjunction with the personal computer 208 to provide the same or similar operational management as provided to the set top box 206. In one embodiment, the middleware server 216 may be configured to execute software 218 that operates to manage quality of service (QoS) and/or convert the video content between different aspect ratios. A central office server 220 may be utilized to provide communication services for a customer using the personal computer 208, where the communication services may include Internet access, as understood in the art. In one embodiment, the central office server 220 may be configured to execute a converter unit 222 that is software and/or hardware that converts the video content 209 between aspect ratios. While the set top box 206 is the more likely device to perform conversion between aspect ratios, it should be understood that alternative network devices, such as the central office server 220 or middleware server 216 may be utilized to perform the conversion.

With regard to FIG. 3A, a computer 302, such as a personal computer, is shown to include a processing unit 304 that executes software 306. The processing unit 304 may be in communication with memory 308, input/output (I/O) unit 310, and storage unit 312. The storage unit 312 may be configured to store one or more data repositories 314a-314n (collectively 314). The software 306 may be configured to download video content via the I/O unit 310 from a communications network, such as the Internet. In one embodiment, the software 306 may be configured to store the video content in the data repositories 314 for play on a local electronic display or communicate to set top box 316 for display on a television (not shown).

The set top box 316 may be configured with a processing unit 318 that executes software 320. The processing unit 318 may be in communication with a memory 322, I/O unit 324, and storage unit 326. The storage unit 326 may be configured with one or more data repositories 328a-328n (collectively 328). The processing unit 318 may further be in communication with a conversion unit 330 that operates to convert video content from one aspect ratio to another. In one embodiment the conversion unit 330 may be configured to convert video content from an aspect ratio of 4:3 to an aspect ratio of 16:9. The software 320 being executed by the processing unit 318 may perform an initial determination as to whether the video content is configured or able to be displayed in an aspect ratio of 16:9, and if so, the conversion unit 330 may be utilized to convert the aspect ratio of the video content from 4:3 to 16:9.

In operation, the computer 302 may be configured to communicate video content 332 to the set top box 316. In one embodiment, the computer 302 may communicate the video content 332 via the I/O unit 310 to the set top box 316 via I/O unit 324 over a local area network (LAN) or communicate via a wide area network (WAN), such as the Internet, for communication to the set top box 316. It should be understood that a wide number of techniques may be utilized to communicate the video content 332 between the computer 302 and set top box 316. An aspect ratio parameter (ARP) 334 (e.g., "ASP169") may be communicated with the video content 332, which, when received by the set top box 316, may be utilized to determine whether the video content 332 may be converted or displayed using an aspect ratio of 16:9, 4:3, or both. It should be understood that other aspect ratios may be utilized depending on configurations of televisions or electronic displays. The software 320 may further be configured to automatically detect or determine the aspect ratio parameter 334 or the video content itself to automatically display the video content in a 16:9 aspect ratio or enable the user to selectably select which aspect ratio to display the video content.

With regard to FIG. 3B, illustrative software 306 executed on the computer is shown. The software 306 may include a download video content module 336 that is configured to download video content from a communications network or local device (e.g., DVD). The download video content module 336 may be a stand-alone module or integrated into a larger software package. In an alternative embodiment, the download video content module 336 may be integrated into a web browser or accessed via a browser. A send video content module 338 may be configured to communicate video content to a set top box for display on a television. In one embodiment, the send video content module 338 may be configured to communicate the video content via a wide area network or local area network to the set top box. The send video content module 338 may communicate an aspect ratio parameter with the video content. If the aspect ratio parameter is embedded in the video content itself, there is no need to communicate a separate aspect ratio parameter.

With regard to FIG. 3C, the software 320 may include a receive video content module 340 that is configured to receive video content being communicated from the send video content module 338 (FIG. 3B). The receive video content module 340 may store the video content in memory or a storage unit. An identify aspect ratio parameter module 342 may be configured to identify an aspect ratio that the video content may be displayed. For example, the aspect ratio may be determined by parsing a header of the video content or receiving a separate alphanumeric string sent along with the video content to the set top box from the computer. A convert video content aspect ratio module 344 may be configured to convert the video content from a first aspect ratio (e.g., 4:3) to a second aspect ratio (e.g., 16:9). The convert video content aspect ratio module 344 may be configured to automatically convert the aspect ratio of the video content or respond to a request prompted by the module 344 or other module to a user as to which aspect ratio to display the video content. A display video content module 346 may be configured to display the video content in the appropriate aspect ratio (i.e., either converted video content or the video content without conversion).

With regard to FIG. 4, an illustrative television 400 may be configured to display a window 402 or region on the television 400 generated by a set top box (not shown) that includes query and selection options as to a particular aspect ratio that the user may have available to view video content. Selection options 404a and 404b may be available to the user to select which of the two aspect ratios that the user may view the video content. It should be understood that if the video content cannot be displayed in an aspect ratio, such as 16:9, that the user may not be presented with the option or may be displayed with a "grayed out" option in the window. The window 402 may be displayed as a result of the software 320 (FIGS. 3A and 3C) being executed on the set top box 316 determining that video content is capable of being displayed in multiple aspect ratios.

Figure 5:
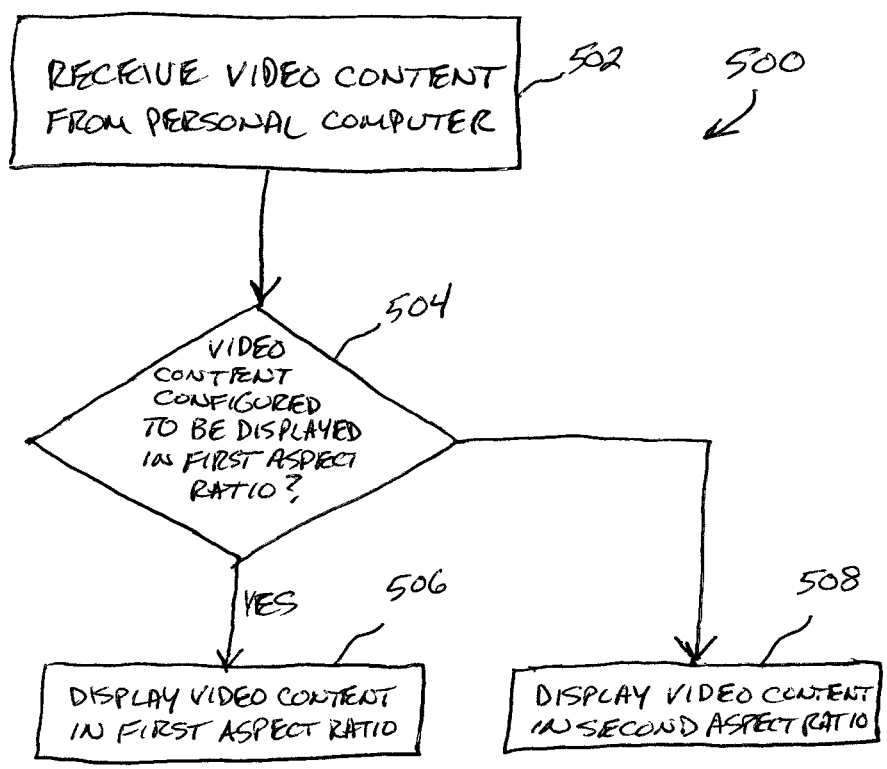
FIG. 5 is a flowchart of an illustrative process for displaying video content on a television in a desired aspect ratio.

With regard to FIG. 5, an illustrative process 500 for enabling video content to be displayed in one of multiple different aspect ratios is provided. The process 500 starts at step 502, where video content may be received from a personal computer. It should be understood that the term personal computer may be representative of other types of electronic devices, such as mobile devices (e.g., smart telephones) that a user may utilize to download video content. At step 504, a determination as to whether the video content is configured to be displayed in a first aspect ratio may be made. If so, then the process continues at step 506, where the video content is displayed in the first aspect ratio. In displaying the video content in the first aspect ratio, a conversion of the video content from a second aspect ratio to the first aspect ratio may be made. For example, the video content may be converted from a 4:3 to a 16:9 aspect ratio. If at step 504 a determination is made that the video content is not configured to be displayed in the first aspect ratio, then the video content may be displayed in a second aspect ratio at step 508. The second aspect ratio may be 4:3.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for displaying video content in a proper aspect ratio, said method comprising:
   receiving, at a smart telephone, video content from a head-end server via a broadband gateway;
   receiving, at a set top box, the video content from the head-end server via the smart telephone over a local area network;
   in response to the video content being received from the head-end server via the smart telephone, determining at the set top box if the video content is configured to be displayed in a first aspect ratio on a display device, said display device being separate from the smart telephone;

if the video content is configured to be displayed in the first aspect ratio, displaying the video content in the first aspect ratio on the display device; and if the video content is not configured to be displayed in the first aspect ratio, displaying the video content in the second aspect ratio on the display device;

wherein converting is performed during streaming of the video content.

2. The method according to claim 1, wherein displaying the video content in the first aspect ratio includes converting the video content from the second to the first aspect ratio.

3. The method according to claim 2, wherein the first aspect ratio is 16:9.

4. The method according to claim 1, wherein the second aspect ratio is 4:3.

5. The method according to claim 1, further comprising establishing a communications link between a set top box and the smart telephone prior to determining if the video content is configured to be displayed in the first aspect ratio.

6. The method according to claim 1, further comprising querying a user whether to display the video content in the first aspect ratio or the second aspect ratio.

7. The method according to claim 6, further comprising, in response to receiving a selection from the user, setting a parameter to cause the video content to be displayed in the first or second aspect ratio.

8. The method according to claim 1, wherein displaying the first content in the first or second aspect ratio is performed automatically.

9. The method according to claim 1, further comprising identifying an aspect ratio parameter received with the video content.

10. A system for displaying video content in a proper aspect ratio, said system at set top box, the set top box comprising:

a memory;

an input/output (I/O) unit; and a processing unit in communication with said memory and I/O unit, said processing unit configured to:

receive video content from head-end server via a smart telephone over a local area network, wherein the video content is received, at the smart telephone from the head-end server via a broadband gateway;

in response to the video content being received from the head-end server via the smart telephone, determining if the video content is configured to be displayed in a first aspect ratio on a display device, said display device being separate from the smart telephone;

if the video content is configured to be displayed in the first aspect ratio, displaying the video content in the first aspect ratio on the display device; and if the video content is not configured to be displayed in the first aspect ratio, displaying the video content in the second aspect ratio on the display device;

wherein converting is performed during streaming of the video content.

11. The system according to claim 1, further comprising a conversion unit configured to convert the video content from the second to the first aspect ratio.

12. The system according to claim 2, wherein the first aspect ratio is 16:9.

13. The system according to claim 2, wherein said conversion unit is configured to convert the video content during streaming of the video content.

14. The system according to claim 1, wherein the second aspect ratio is 4:3.

15. The system according to claim 1, wherein said processing unit is further configured to establish a communications link between a set top box and the smart telephone prior to determining if the video content is configured to be displayed in the first aspect ratio.

16. The system according to claim 1, wherein said processing unit is further configured to query a user whether to display the video content in the first aspect ratio or the second aspect ratio.

17. The system according to claim 6, wherein said processing unit is further configured to, in response to receiving a selection from the user, set a parameter to cause the video content to be displayed in the first or second aspect ratio.

18. The system according to claim 1, wherein said processing unit is configured to automatically display the first content in the first or second aspect ratio.

19. The system according to claim 1, wherein said processing unit is further configured to identify an aspect ratio parameter received with the video content.

* * * * *